US011915218B2

(12) United States Patent
Savinon et al.

(10) Patent No.: US 11,915,218 B2
(45) Date of Patent: Feb. 27, 2024

(54) REPAYMENT APPLICATION PROGRAMMING INTERFACE

(71) Applicant: MASTERCARD INTERNATIONAL INCORPORATED, Purchase, NY (US)

(72) Inventors: Claudia Savinon, White Plains, NY (US); Marquis McGuffin, New York, NY (US); Andrea Londono, Hauppauge, NY (US); Mitchell H. Cooper, Ridgefield, CT (US); Daniel Gerard Goold, Queens, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 17/116,380

(22) Filed: Dec. 9, 2020

(65) Prior Publication Data

US 2021/0174324 A1 Jun. 10, 2021

Related U.S. Application Data

(60) Provisional application No. 62/945,400, filed on Dec. 9, 2019.

(51) Int. Cl.
| | | |
|---|---|---|
| *G06Q 20/20* | (2012.01) | |
| *G06F 8/61* | (2018.01) | |
| *G06F 9/451* | (2018.01) | |
| *G06F 9/54* | (2006.01) | |
| *G06Q 20/10* | (2012.01) | |
| *G06Q 20/14* | (2012.01) | |

(Continued)

(52) U.S. Cl.
CPC ............ *G06Q 20/202* (2013.01); *G06F 8/61* (2013.01); *G06F 9/547* (2013.01); *G06Q 20/351* (2013.01);

(Continued)

(58) Field of Classification Search
CPC ...... G06Q 20/202; G06Q 20/351; G06F 8/61; G06F 9/547

(Continued)

(56) References Cited

U.S. PATENT DOCUMENTS

2007/0288357 A1* 12/2007 Holman ................ G06Q 40/02
705/38
2008/0052229 A1* 2/2008 Sheinker ............... G06Q 30/06
705/40

(Continued)

OTHER PUBLICATIONS

Villasenor, John; West, Darrell. The 2015 Brookings Financial and Digital Inclusion Project Report. M.Brookings Institution Reports; Washington, (Aug. 2015). (Year: 2015).*

(Continued)

*Primary Examiner* — Florian M Zeender
*Assistant Examiner* — Fawaad Haider
(74) *Attorney, Agent, or Firm* — Buckley, Maschoff & Talwalkar LLC

(57) ABSTRACT

Provided are systems and methods for configuring and implementing a loan repayment based on transactions output from a merchant POS terminal. In one example, the method may include receiving point-of-sale (POS) transactions from a merchant POS terminal, receiving, via an application programming interface (API), a request to allocate a portion of the POS transactions from the merchant POS terminal to a lender payment account, depositing the POS transactions received from the merchant POS terminal into a merchant payment account during a settlement process, and automatically triggering a payment transaction that pushes the portion of the POS transactions from the merchant payment account to the lender payment account.

16 Claims, 10 Drawing Sheets

(51) Int. Cl.
  *G06Q 20/34* (2012.01)
  *G06Q 20/40* (2012.01)
  *G06Q 40/03* (2023.01)

(52) U.S. Cl.
  CPC ........... *G06F 9/451* (2018.02); *G06Q 20/102* (2013.01); *G06Q 20/14* (2013.01); *G06Q 20/405* (2013.01); *G06Q 40/03* (2023.01)

(58) Field of Classification Search
  USPC .......................................................... 705/21
  See application file for complete search history.

(56) References Cited

U.S. PATENT DOCUMENTS

| 2008/0195534 A1* | 8/2008 | Landis ................... G06Q 40/00 705/39 |
| 2009/0043697 A1* | 2/2009 | Jacobs ................... G06Q 20/10 705/39 |
| 2017/0169508 A1* | 6/2017 | Song ..................... G06Q 20/223 |
| 2020/0051055 A1* | 2/2020 | Nam ...................... G06Q 20/40 |

OTHER PUBLICATIONS

Anonymous. Editorial: Small loans on the up-and-up. McClatchy—Tribune Business News; Washington [Washington]. Jan. 5, 2010. (Year: 2010).*

Unknown. Online Lending Sites Offer Alternative to Traditional Borrowing. New York Times (Online), New York: New York Times Company. Oct. 1, 2014. (Year: 2014).*

\* cited by examiner

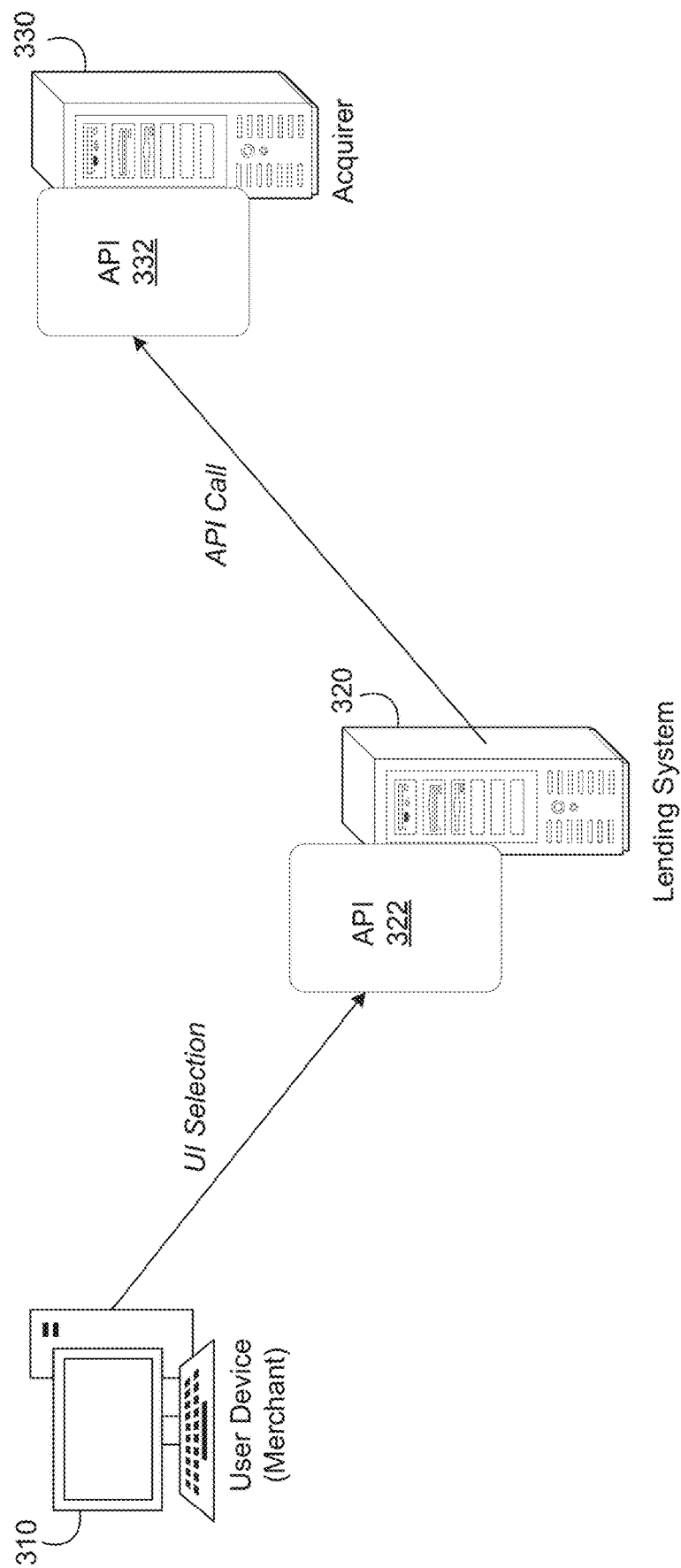

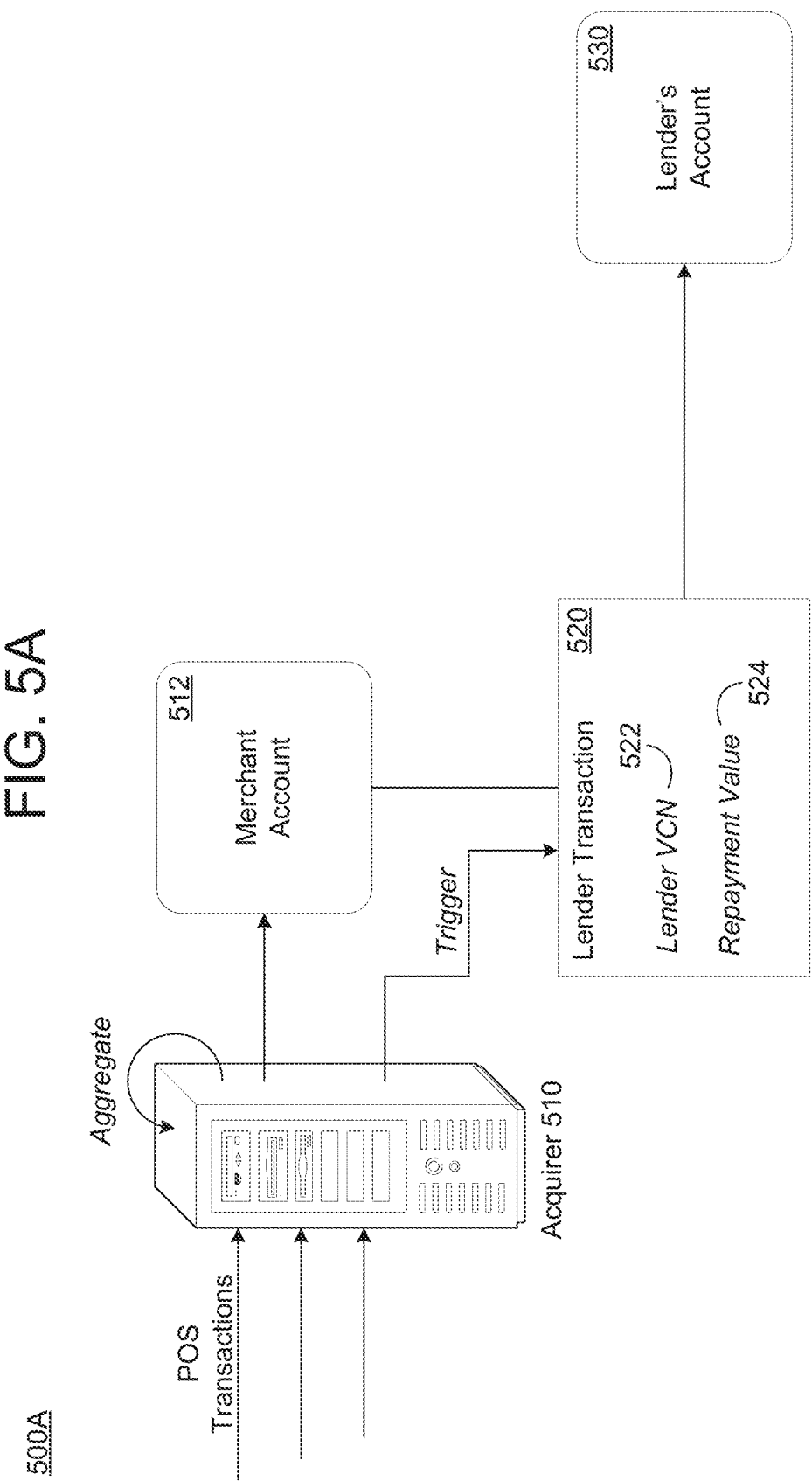

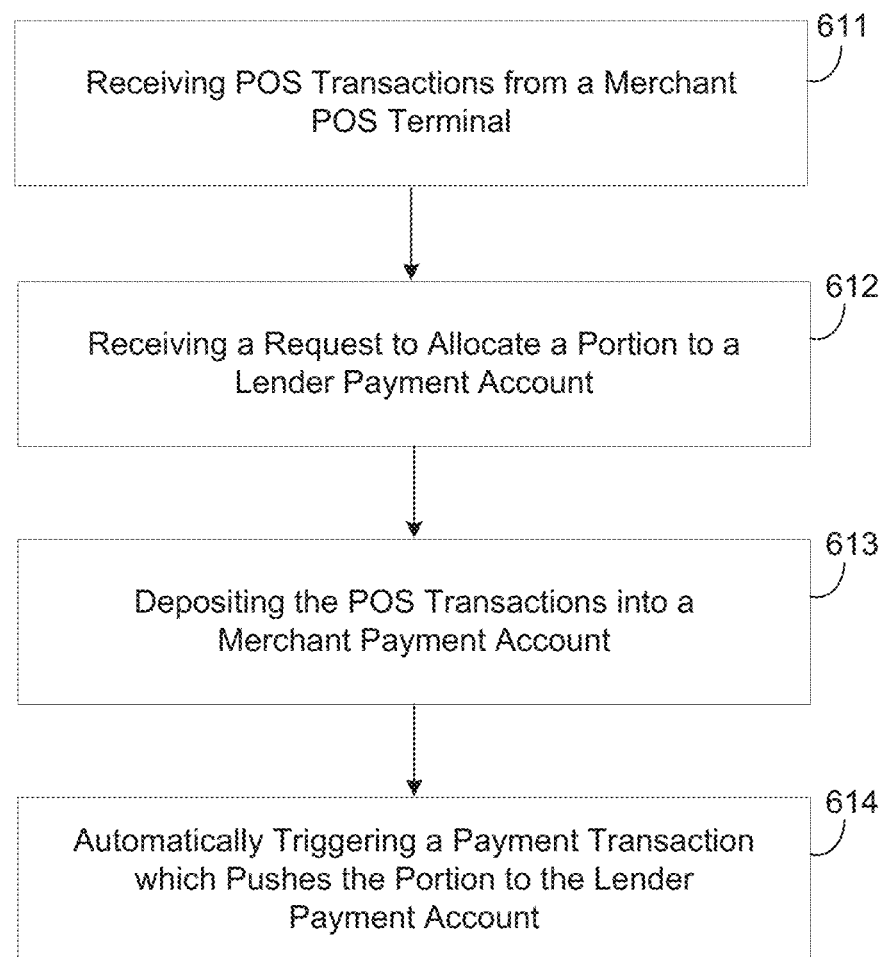

REPAYMENT APPLICATION PROGRAMMING INTERFACE

CROSS-REFERENCE TO RELATED APPLICATIONS

The present application claims the benefit under 35 USC § 119(e) of U.S. Provisional Patent Application No. 62/945,400, filed on Dec. 9, 2019, in the United States Patent and Trademark Office, the entire disclosure of which is hereby incorporated by reference.

BACKGROUND

Small businesses are a vital and growing segment of the global economy. Many small businesses rely on loans from lenders (e.g., banks, credit unions, and other financial institutions) to get their business off the ground. The added capital can be essential to secure inventory, purchase equipment, rent an operational space, hire employees, and the like. However, there are a significant number of barriers which small businesses face when attempting to secure a loan. Examples of the barriers include lack of a solid business plan, poor credit history or no credit history, limited cash flow, too many loan applications out, disorganization, and the like. As a result, many small businesses are denied loans. Furthermore, lenders are notoriously reluctant to lend to small businesses because these types of loans are a riskier proposition for a financial institution than an established business. Furthermore, given that the cost for underwriting a small loan is approximately the same as underwriting a larger loan, lenders can increase their profits by focusing on larger loans to bigger businesses.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating a communication process for configuring loan repayment in accordance with an example embodiment.

FIG. 5A is a diagram illustrating a settlement process performed by an acquirer system in accordance with an example embodiment.

FIG. 6B is a diagram illustrating a method of pushing a payment based on a ratio value configured by a merchant in accordance with an example embodiment.

Figure 1:
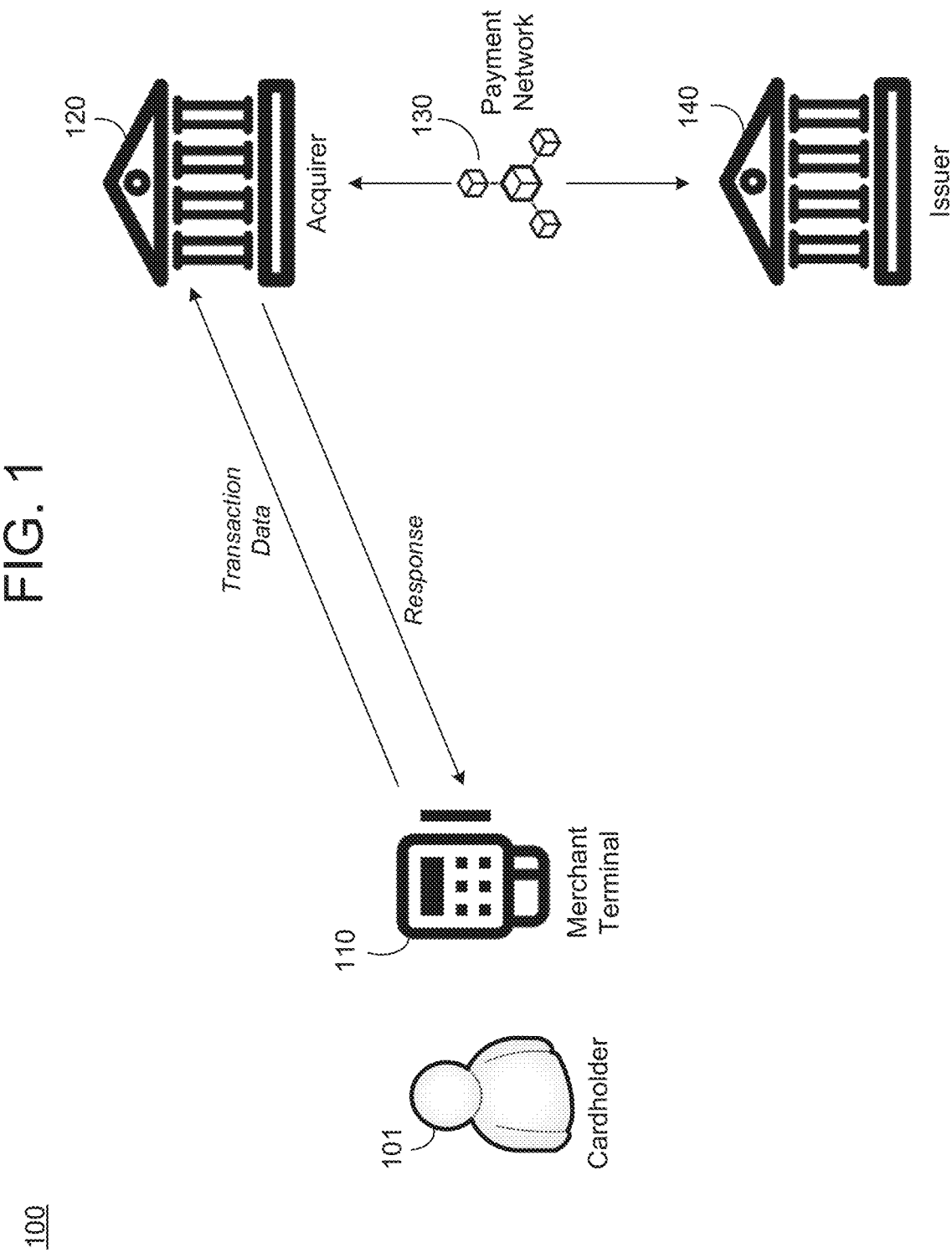
FIG. 1 is a diagram illustrating a payment processing network for processing a transaction in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The lending process can be a struggle for small businesses, which often are the most in need of capital to get their business of the ground. The example embodiments provide a level of comfort to lenders when lending money to small business through a new application programming interface (API) that connects a merchant, a merchant's lender, and a merchant's acquiring bank ("acquirer"). In particular, a merchant can access the lender via the API, and designate a portion/fraction of their daily transactions performed/captured on a merchant's point-of-sale (POS) terminal to be pushed by the acquirer to the lender. Here, the lender may provide a user interface which enables a merchant to make selections and which also educates the merchant on the impact of their selections.

The lender may communicate the percentage set by the merchant to the acquirer via the API. Here, the API enables the lender to transmit a request to the acquirer to implement the percentage set by the merchant. For example, a daily settlement process may occur (e.g., overnight). During this process, a percentage of merchant POS transactions for that day may be pushed to the lender. Thus, the API allows the merchant to communicate with the lender, and the lender to communicate with the acquirer (of the merchant). Through these communications, the merchant can designate a portion of each transaction made at the POS terminal to be routed to the lender to settle an existing obligation.

Software which includes a first API may be installed on the lender's computing system or on a financial services computing system associated with the lender. A merchant (using a computing system) may communicate with the lender (lender computing system) via the API. Here, the lender may output a user interface that enables the merchant/user to configure how much of each transaction should be routed to the lender. The user interface may include graphical icons and elements that can be used to adjust or modify a payback ratio of each transaction. In addition, the lender may educate, via the user interface, the merchant on the impact of choosing a percentage of daily receipts on their payments to be pushed to the lender. For example, the user interface may output an estimated loan repayment data, an estimated monthly repayment amount, and the like. The lender may calculate an estimate of the forecasted impact on a monthly value that will be repaid by the merchant borrower during a current month based on the received selection of the ratio value and display the estimate on the user interface using merchants prior POS receivables and issuer inputs. For example, the estimate may take into consideration a predetermined number of previous months (e.g., three months, five months, etc.) of POS receipts.

Software which includes a second API may be installed on an acquirer's computing system. This portion of the API may enable the lender to communicate directly with the acquiring bank. Here, the API may establish data communication protocols (data format, message type, encryption, security, networking, etc.) between the lender computing system and the acquirer's computing system. The lender may generate an API call which is then sent to the acquirer via the API. The API call may include a request to split merchant POS transactions along with the ratio received from the merchant via the first API.

Once the repayment ratio has been configured via the lender computing system (or the fintech computing system), and forwarded to the acquirer, the lender may receive periodic payments from the merchant POS terminal in an automated fashion. For example, during a daily settlement process, the acquirer may automatically push a percentage of the payment transactions captured by the POS terminal of the merchant that day to the lender's account. Each day, an additional push payment may be performed based on the percentage ratio set by the merchant. Thus, a secure repayment process can be created based on POS terminal transactions (swipes, readings, chip payments, e-commerce payments, etc.)

In the examples herein, a cardholder may be a person who obtains a bank card such as a payment card, a debit card, a credit card, and the like. It should be appreciated that the cardholder may also be referred to as an account holder, or the like. The payment vehicle need not be a plastic card. Instead, the payment vehicle may include a digitized payment account stored on a mobile device, etc.

A merchant is any business that sells goods or services. A merchant can accept payment cards from a cardholder as a form of payment. A merchant maintains a merchant account (e.g., with an acquiring bank, etc.) that enables them to accept credit cards and debit cards as payments and have the funds deposited therein.

An acquiring bank (also referred to herein as an acquirer) is a registered member of the card associations (e.g., Visa and MasterCard). An acquiring bank is often referred to as a merchant bank because they contract with merchants to create and maintain accounts (called merchant accounts) that allow the business to accept credit and debit cards. Acquiring banks provide merchants with equipment and software to accept cards and handle customer service and other necessary aspects involved in card acceptance. The acquiring bank also deposits funds from credit card sales into a merchant's account.

An issuing bank (also referred to herein as an issuer) issues credit cards to consumers. The issuing bank is also a member of the card associations (Visa and MasterCard). Issuing banks pay acquiring banks for purchases that their cardholders make. It is then the cardholder's responsibility to repay their issuing bank under the terms of their credit card agreement.

FIG. 1 illustrates a payment processing network 100 for processing a transaction in accordance with an example embodiment. Referring to FIG. 1, a cardholder 101 provides account information (e.g., a payment card, etc.) to a merchant which is then run through a merchant terminal 110 such as a point-of-sale (POS) terminal, a point-of-interaction (POI) terminal, and the like. Payment data may be entered into the merchant terminal 110 using various means. For example, a magnetic stripe of a card may be swiped, an electronic chip embedded in the card may be inserted, a keypad may receive input, or the like. As another example, the payment vehicle may provide a wireless signal such as a tap, etc. As another example, the merchant terminal 110 may be an e-commerce terminal that receives card data via a web portal, Internet, etc. Therefore, while some of the examples herein refer to transactions captured by a POS terminal in-store, the example embodiments may also apply to e-commerce transactions that are captured by a POS terminal connected to the interne, an e-commerce checkout page, and the like.

The merchant terminal 110 transmits the payment card data to an acquiring bank (acquirer 120) of the merchant. For example, the acquirer 120 (or its processor) captures the transaction information and routes it through a payment card network 130 to the cardholder's issuing bank (issuer 140) for approval. The payment network 130 may include MasterCard's Banknet network, Visa's VisaNet network, and the like.

The issuer 140 receives the transaction information from the acquirer 120 through the payment network 130 and responds by approving or declining the transaction after checking to ensure, among other things, that the transaction information is valid, the cardholder 101 has sufficient balance to make the purchase and that the account is in good standing. The issuer 140 sends a response code back through the payment network 130 to the acquirer 120. The response code is sent back to the merchant terminal 110. If approved, the transaction is stored in a batch file awaiting settlement.

The second part of the credit card transaction process is clearing and settlement. This occurs after the authorization process takes place. For settlement, the merchant sends a "batch" of authorizations to a payment processor, typically once per day. The processor reconciles the authorizations and submits the batch over the card association networks. The processor also deposits the funds from those sales into the business's bank account and deducts processing fees. At that point, the business's role is complete. Furthermore, the issuer 140 and the acquirer 120 continue to communicate and move money (with the issuing bank paying the acquiring bank for the cardholders' purchases) and the cardholder eventually pays the issuing bank.

The merchant begins the settlement process by sending a batch of approved authorizations to the acquirer 120. Authorization batches are typically sent at the close of each business day. Multiple individual credit card transactions make up a batch. The acquirer 120 reconciles and transmits the batch of authorizations through interchange via the payment network 130. The acquirer 120 also deposits funds from sales into the merchant's bank account via the automated clearinghouse (ACH) and debits the merchant's account for processing fees either monthly, daily, or both depending on the merchant's processing agreement. The card association debits the account of the issuer 140 and credits the account of the acquirer 120 for the net amount of the authorizations which is gross receipts less interchange and network fees. The cardholder 101 is responsible for repaying the issuer 140 for the purchase.

According to various embodiments, a merchant may receive a loan (e.g., to operate their business, etc.) from a lender. Loans can be an integral part of getting a business started. However, lenders are notoriously hesitant to loan money to small businesses since they are perceived as a greater risk than a larger more established business. The example embodiments provide for an application programming interface (API) which facilitates communication among a merchant, a lender, and an acquirer (of the merchant). Through the API, a merchant may communicate/connect with a lender to set a percentage of every transaction made at a merchant terminal (e.g., merchant terminal 110 in FIG. 1) to be split such that a percentage of the transaction goes to the lender for repayment of a loan. The lender may connect to the acquirer via the API and forward the percentage to the of the merchant. During an overnight settlement process, the acquirer may split off a portion of the daily transactions corresponding to the percentage and route the percentage to the lender's account. Thus, a lender can receive a daily payment from the merchant based on POS receipts of the merchant which are processed by a merchant POS terminal and sent to the acquirer.

Some of the benefits of this system include improved assurances to a lender to know that they will be receiving a portion of all POS swipes, transactions, e-commerce transactions, etc., made by the merchant. Furthermore, if the merchant generates enough in transactions via the merchant's transactions, the merchant will not need to make monthly payments on their loan. Instead, the acquirer will automatically route money from every transaction to the lender.

Figure 2:
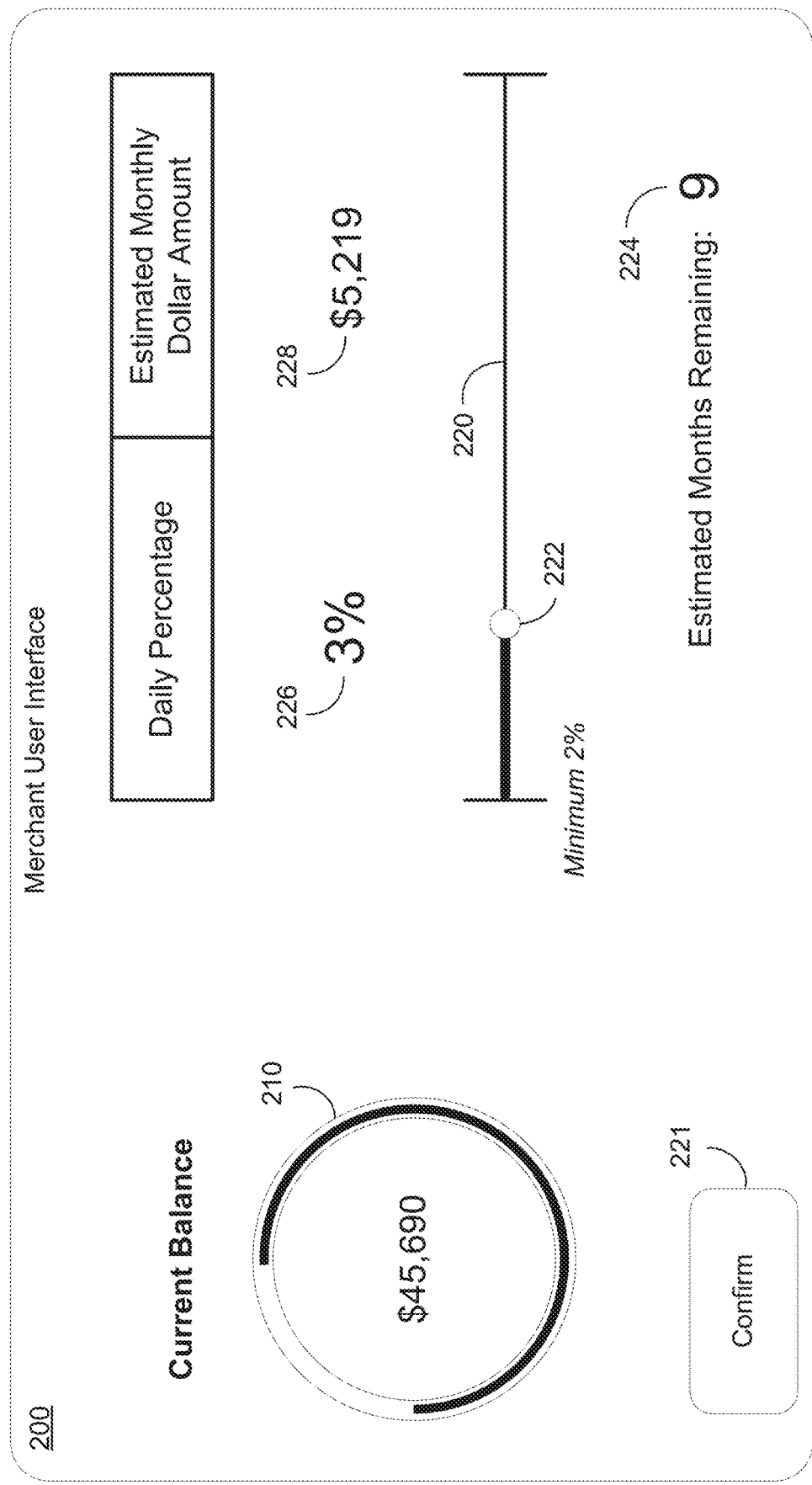
FIG. 2 is a diagram illustrating a user interface for configuring loan repayment in accordance with an example embodiment.

FIG. 2 illustrates an example of a user interface 200 for configuring loan repayment in accordance with an example embodiment. In addition, the user interface 200 may educate the merchant by providing information about how the daily percentage affects the loan repayment. The merchant (e.g., a user with authority to transact on behalf of the merchant) may request a loan from a lender. As part of the services provided with the loan, the lender may also provide a portal, dashboard, etc., which includes the user interface 200. Here, the lender system (e.g., web server, cloud platform, etc.) may have installed therein software such as an application or other program which includes an API according to various embodiments through which software running on the merchant system may interact to view the user interface 200. During the loan process (or at a subsequent time) the merchant user may enroll in the repayment solution described herein.

Through the user interface 200, a merchant user may transmit a communication which selects a percentage of every transaction performed at the merchant terminal to be split and pushed to a lender's account (e.g., during a daily settlement process.) The user interface 200 may provide input mechanisms that enable the user to dynamically configure a repayment ratio 226 which is a percentage of POS transactions that is sent to the lender. Here, the user may move a slider 222 along a bar 220 to adjust the repayment ratio 226. As the user moves the slider 222 and changes the repayment ratio 226, the user interface 200 may also update an estimated monthly dollar amount 228 which will be repaid over the next month. It should also be appreciated that the estimated monthly time period may be changed to a different period of time (e.g., a day, a week, a year, etc.) The estimated monthly dollar amount 228 may be generated based on sales of the merchant over a previous period of time (e.g., a previous three months, etc.) The bar 220 may have an upper and a lower limit. For example, the user may only be allowed to go as low as a minimum of 2% or as much as 5%, etc. These numbers are just for example, and are not meant to be limiting. In some embodiments, when the user moves the slider and then "confirms" the selection of the slider by pressing a confirmation button 1221, etc., the user may be asked to enter authentication data such as a card number, a PIN, a password, a biometric, or the like.

The user interface 200 may also provide a current balance 210 of the merchant's loan, as well as other information which is not shown such as account information, estimated loan repayment date, and the like. A software program, code, system, etc., running on the lender system (or a trusted service) may use the current balance 210 and the estimated dollar amount 228 to determine an estimated time remaining 224 of repayment on the loan. The estimated time remaining 224 may also change as the user moves the slider 222 along the bar 220. The slider 222 gives the user the ability to flexibly adjust the repayment rate at any time.

Accordingly, payments on a merchant loan can be made directly from a POS terminal of the merchant (automating repayments) which gives comfort to the lender and eases the merchant from having to make payments on the bank site or branch. The user interface 200 enables a merchant to select what percentage of a transaction of all transactions processed through the POS terminal may be sliced-off and sent to a lender. The slider enables a percentage to be selected. The lender may also provide various estimates on payment time and amount based on historical sales. The estimates provide the merchant an intuitive idea of how much percentage can pay off of their loan each period (month, week, quarter, etc.) The user interface 200 may be output to the user of the merchant through a lending environment or a fintech of the lender such as a financial services portal (e.g., accounting, taxes, etc.). The lender or the fintech may automatically provide the user interface 200 or it may provide a button/option that allows the user to select the interface and pull it up.

In the examples described herein, the lender outputs the user interface 200. However, as another example, the lender may output a button on a typical customer account page. When the merchant user selects this button, the merchant user's web session may be redirected to a secure service which hosts the user interface 200. For example, the secure service may be that of a payment processor, or the like. The secure service may provide a standardized/uniform user interface for all lenders enabling uniformity and ease of understanding for the users of the system. In this example, the merchant user may input a percentage which is then received by the secure service and forwarded to the lender and/or the acquirer. In addition, the secure service may also perform authentication of the merchant user via a secure channel. The authentication may require a password, PIN, biometric, scan, etc.

FIG. 3A illustrates a data communication process 300A for configuring loan repayment in accordance with an example embodiment. In this example, a merchant communicates with a lender to configure a percentage of merchant transactions to be automatically pushed by an acquirer to the lender. Referring to FIG. 3A, a merchant connects to a lending system 320 using a user device 310. For example, the user device 310 may include a mobile terminal, a desktop computer, a tablet, or the like. The lending system 320 may include a computer, an on-premises server, a web server, a cloud platform, and the like.

In this example, the lending system 320 may download and install software which includes an API 322 which enables the merchant (user device 310) and the lending system 320 to communicate directly. For example, the software may be downloaded from a payment gateway, payment processor, or the like. According to various embodiment, the lending system 320 may include instructions for displaying a portal which provides the user with the ability to configure repayment options such as the user interface 200 shown in FIG. 2. In some embodiments, the lending system 320 may include instructions for performing authentication of the merchant user attempting to access the portal. For example, the lending system 320 may include instructions for managing passwords, user names, card information, and the like. The lending system 320 may also execute algorithms which can estimate the amount of time remaining on the loan repayment and the amount of money that will be provided to the loan repayment for a given period of time based on selections made by the user via the slider 222 on the bar 220, or some other input mechanism. Furthermore, the lending system 320 may display the estimated information within the user interface.

In response to receiving the selection of the repayment configuration from the user device 310, the lending system 320 may generate an API call which includes the repayment information along with merchant information such as an identifier of the merchant (merchant ID, account ID, etc.) and transmit the API call to an acquirer 330 via an API 332. Here, software which includes the API 332 may be downloaded and installed by the acquirer 330 and may enable the lending system 320 and the acquirer 330 to communicate directly with one another for data communications. The API call may include the repayment configuration details selected via the user interface such as the percentage/ratio of payment to push to the lender. Thus, the repayment configuration data flows from the merchant (user device 310) to the lender (lending system 320), and then to the acquirer 330. Meanwhile, as further explained in FIG. 3B, the payment flows from a merchant terminal, to the acquirer, and then to a lender's account.

In the example of FIG. 3A, the API 322 and the API 332 are operating on the lending system 320 and the acquirer 330, respectively. The API 322 may be referred to as a configuration API, and the API 332 may be referred to as a send API. A software programming running on the merchant device may engage with software running on the lending system via the API 322 of the lending system 320, and the lending system 320 forwards a data signal (e.g., a message with the repayment percentage, an identifier of the merchant, other content, etc.) to the acquirer 330 via the API 332. In this way, the merchant tells the lending system 320 how much they want to repay, which is then forwarded from the lending system 320 to the acquirer 330. Meanwhile, the pushing of funds may occur from the acquirer 330 to the lender's bank or the lender itself via a push payment protocol.

The system described herein provides comfort about the repayment of a loan which is traditionally seen as a risky space. Merchants struggle to gain financing because they are considered a risky loan. Rather than relying on the merchant to do accounting, plan cashflow, and make an end of the month payment, the APIs 322 and 332 enable communications to flow from the merchant to the lender, and to the acquirer.

Although not shown in FIG. 3A, in some embodiments, a secure server may be included within the process 300A, and may output the user interface. For example, the lending system 320 may include a link, button, tab, etc., within a website of the lending system which when selected routes the user device 310 to the user interface hosted by the secure service. In this way, the secure service may provide a standardized user interface from across different lenders. Furthermore, the secure service may perform authentication of the merchant user.

Figure 3B:
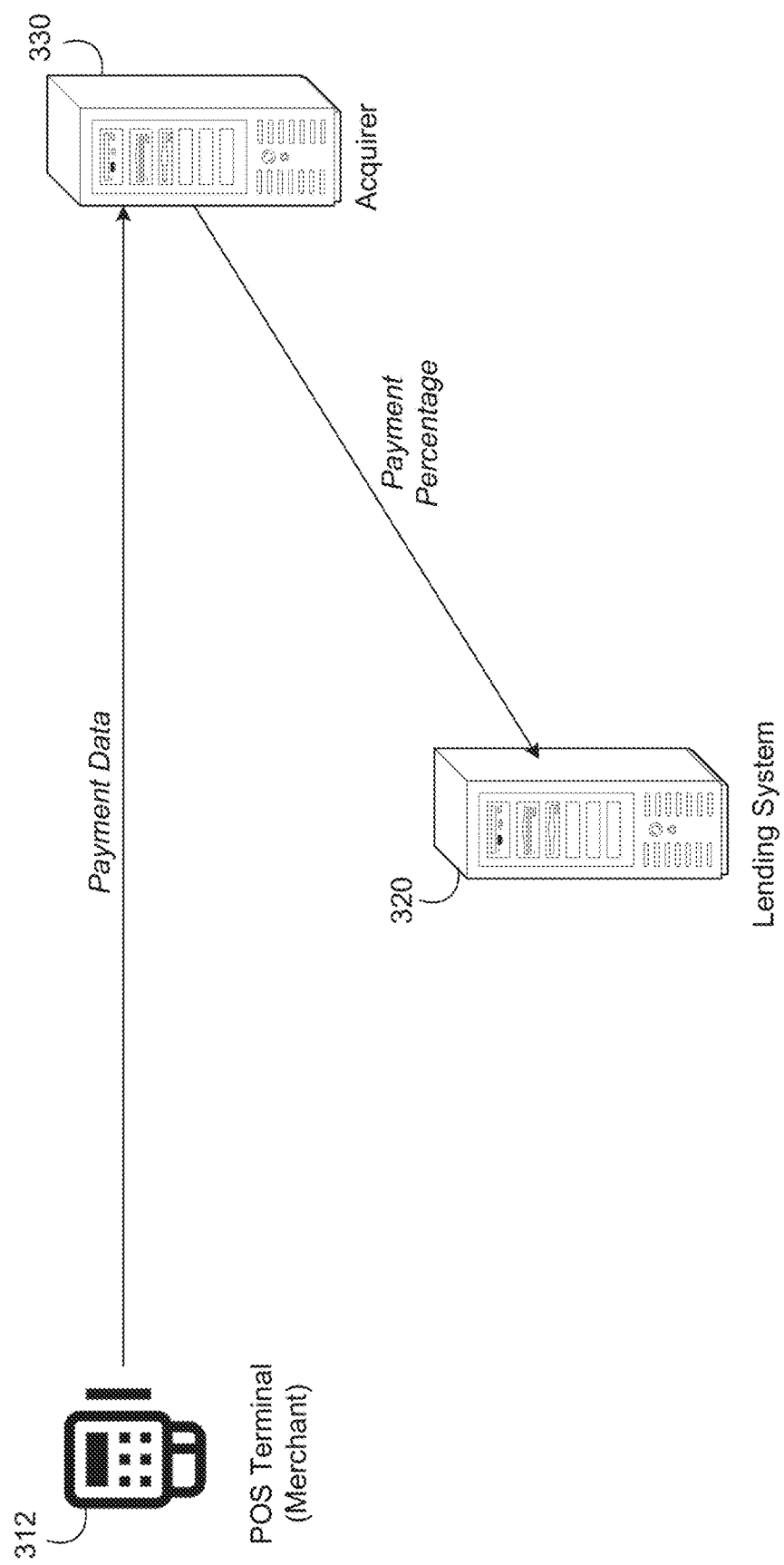
FIG. 3B is a diagram illustrating a payment process for splitting POS receipts based on configuration performed in FIG. 3A, in accordance with an example embodiment.

FIG. 3B illustrates a payment process 300B for pushing a percentage of daily merchant POS transactions to a lender based on configuration performed in FIG. 3A, in accordance with an example embodiment. Referring to FIG. 3B, a merchant POS terminal 312 receives payment transactions during a checkout process, etc. Here, the merchant POS terminal 312 may be a terminal located in a merchant's store or a terminal located on the web for processing e-commerce transactions. In this example, the payment transactions are forwarded by the POS terminal 312 to the acquirer 330 as in a traditional payment process. The acquirer 330 may aggregate merchant POS transactions until an overnight settlement process. During settlement, the acquirer 330 may push a portion of the funds (e.g., a repayment percentage ratio) to an account associated with the lending system 320. For example, the acquirer 330 may trigger the percentage to be split from the daily POS terminal transactions and forward to the lending system 320.

Figure 4:
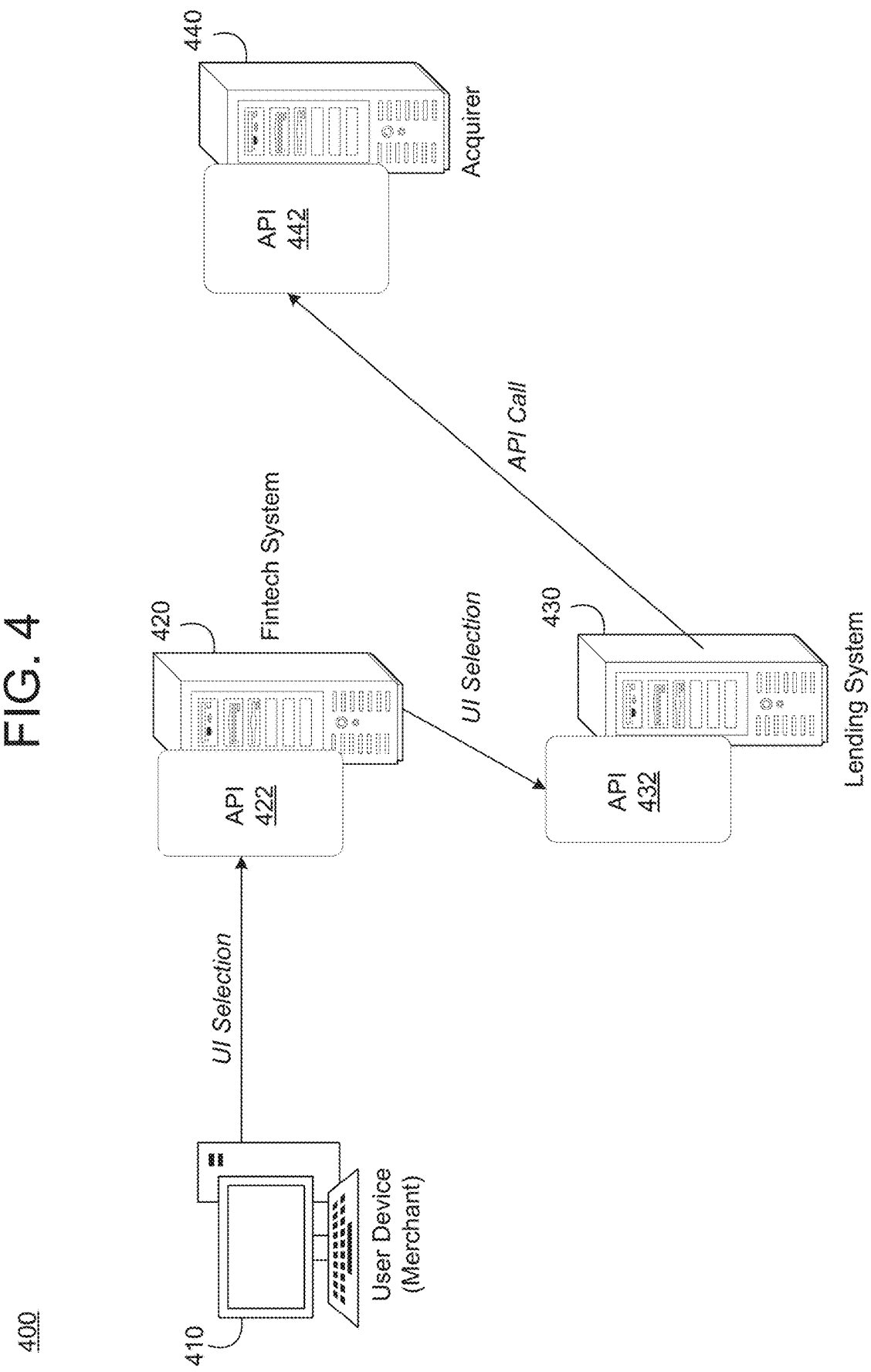
FIG. 4 is a diagram illustrating a communication process for configuring loan repayment in accordance with another example embodiment.

FIG. 4 illustrates a communication process 400 for configuring loan repayment in accordance with another example embodiment. In this example, rather than the merchant user communicating directly with the lending system, the merchant user may communicate with a financial services company (fintech system 420). In this case, the fintech system 420 provides financial services to the lender such as accounting, taxes, retirement planning, estate planning, and the like.

Referring to FIG. 4, the fintech system 420 may provide the user interface for configuring loan repayment settings to a merchant user on a user device 410. The merchant user (user device 410) may access the fintech system 420 and the user interface via the API 422. In response, the merchant user may configure settings of a percentage of POS transactions to be forwarded to a lending system 420 which has provided a loan to the merchant. In this example, the merchant user controls the user device 410 to access a cashflow management tool or other portal provided by the fintech system 420. Thus, rather than connect to the lender directly, the user device 410 may connect directly to the fintech system 420. Meanwhile, the fintech system 420 may forward the repayment information selected by the user to a lending system 430 via an API 432. Furthermore, the lending system 430 can create an API call and forward the API call to an acquirer 440 via an API 442 operating on the acquirer 440. In this example, the API call may include information for pushing a percentage of daily POS terminal transactions from the merchant's POS terminal that are received by the acquirer 440 to the lending system 430.

In this example, the fintech system 420 is the point of engagement for the merchant. Therefore, the data messaging with the percentage/ratio data can pass from the fintech system 420, to the lending system 430, and to the acquirer 440. In this example, the interface may not be embedded in the lending environment, but the functionality may be embedded in a fintech environment such as tax planning and accounting. The fintech services may be an overlay that the merchant uses to manage their operations. In this way, software which includes the API may be installed on the fintech system as well.

In the examples of FIGS. 3A, 3B, and 4, separate APIs are running on the respective devices. However, it should be appreciated that the functionality of the different APIs may be implemented within one comprehensive API that can be running on both of the lending system and the acquirer.

FIG. 5A illustrates a settlement process 500A performed by an acquirer system in accordance with an example embodiment. Referring to FIG. 5A, an acquirer 510 (e.g., server, computing device, etc.) that has issued a payment account 512 of the merchant, may receive POS transactions from the merchant's POS terminal. The transactions may be payment card transactions in which the merchant POS terminal reads payment account data from a magnetic stripe or an electronic chip embedded in the payment card. As another example, the transactions may include NFC transactions such as those captured via NFC communications from a mobile device (digital wallet) of a cardholder. Other examples include e-commerce transactions, and the like, which are received via the Internet.

The acquirer 510 may aggregate the POS transactions over a predetermined period of time, for example, a one day cycle, or the like. At a predetermined point in time, the acquirer 510 may initiate a settlement process, for example, an overnight settlement process. The settlement process may be initiated with a deposit transaction into the merchant's payment account 512. According to various embodiments, the acquirer 510 may simultaneously (almost instantaneously) execute an additional transaction 520 which transfers funds from the merchant's payment account 512 to a lender's payment account 530 based on the repayment value. Here, the acquirer 510 may wait for a predetermined period of time (e.g., 1 second, etc.) from depositing the funds into the merchant's payment account 512 during the settlement process, and trigger the transaction 520 to automatically push money out of the merchant's payment account 512 to the lender's payment account 530. The push transfer may be performed instantaneously or almost instantaneously with the initial deposit thereby preventing the merchant from spending the funds.

For example, the acquirer 510 may generate the transaction 520 to include a payment value 524 based on a ratio/percentage of repayment that is owed to the lender and configured via the API described herein. The acquirer 510 may insert an identifier 522 of the lender into the transaction 520 in order for the transaction 520 to be routed to the correct account via a payment network. As an example, the identifier 522 may be a virtual card number (VCN) or the like, of the lender that uniquely identifies the lender's payment account 530. The acquirer 510 may store a table or other data structure which maps the merchant to the lender, and which maps the lender to a unique identifier such as a VCN.

Figure 5B:
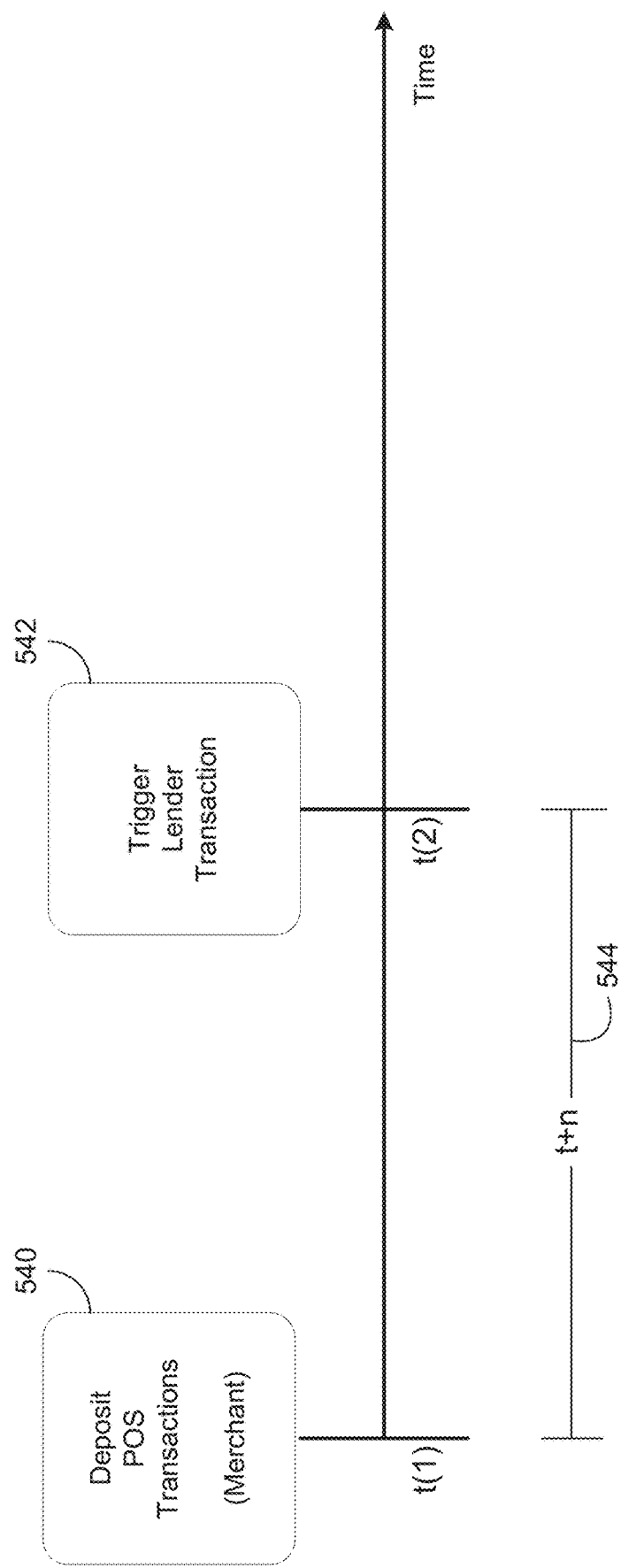
FIG. 5B is a diagram illustrating a timing process of initiating a second transaction during a settlement process in accordance with an example embodiment.

FIG. 5B illustrates a timing process 500B of initiating a second transaction during a settlement process in accordance with an example embodiment. Referring to FIGS. 5A and 5B, the acquirer 510 may execute a deposit transaction 540 to deposit the funds from the POS transactions from the merchant POS terminal into the merchant's payment account 512 at a first point in time (t1). The first point in time (t1) may correspond to the start/beginning of the overnight settlement process. Next, the acquirer 510 may initiate/trigger a second payment transaction 542 to push money from the merchant's payment account 512 to the lender's payment account 530 at a second point in time (t2) which is almost instantaneous with the first point in time (t1) at which the deposit is made into the merchant's payment account 512.

In this case, there is a period of time (n) 544 between the first point in time (t1) when the deposit transaction 540 is initiated and the second point in time (t2) when the push transaction 542 is initiated. As a non-limiting example, the period of time (n) 544 may be a half second, one second, three seconds, 10 seconds, or the like. It should also be appreciated that the acquirer 510 may dynamically configure the period of time (n) 544 based on information about the merchant such as a risk factor, and the like. For more riskier merchants, the period of time (n) 544 may be shorter than for less riskier merchants.

Figure 6A:
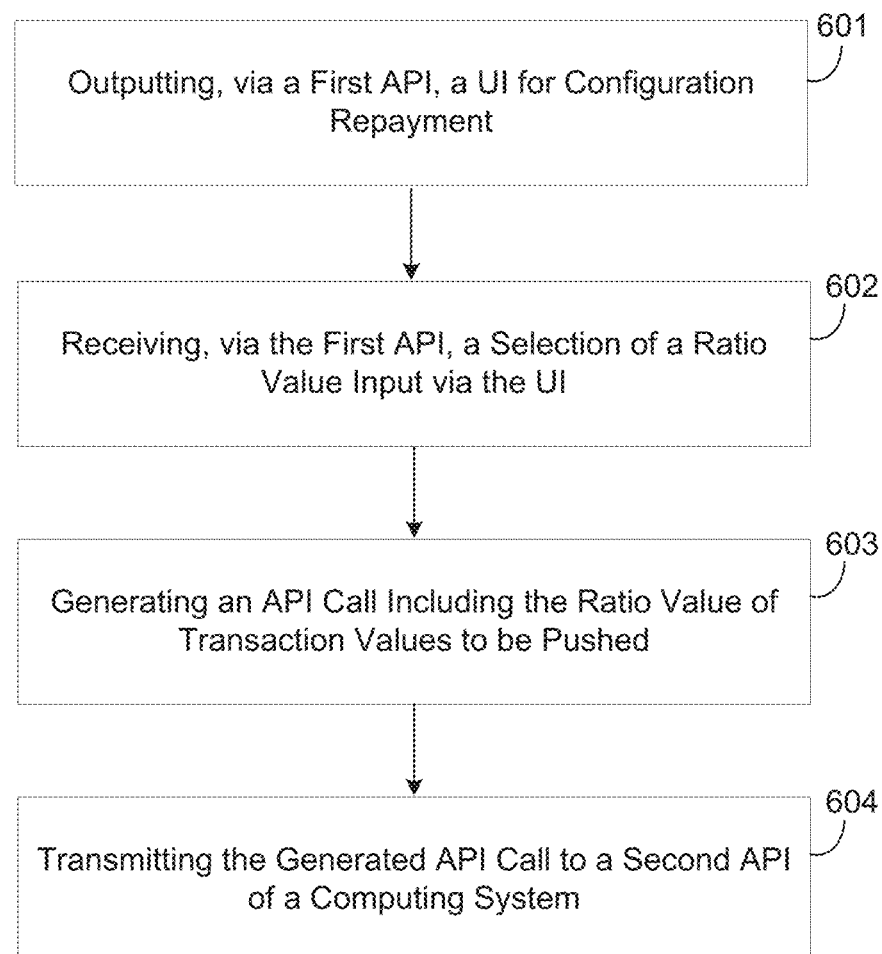
FIG. 6A is a diagram illustrating a method of outputting a user interface for configuring loan repayment in accordance with an example embodiment.

FIG. 6A illustrates a method 600 of outputting a user interface for configuring loan repayment in accordance with an example embodiment. For example, a processing unit (e.g., one or more processors, processing cores, processor threads, etc.) of computing device (e.g., mobile device, personal computer, server, etc.) may execute software program code to cause a computing device including a secure element, to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format.

In some embodiments, hard-wired circuitry may be used instead of, or in combination with program code to implement the methods and processes. Embodiments are not limited to any specific combination of hardware and software. As an example, the method 500 may be performed by a single device such as a secure element within a mobile device, or a combination of multiple devices such as multiple computers distributed across a network.

Referring to FIG. 6A, in 601, the method may include outputting, via a first application programming interface (API), a user interface for configuring repayment of a pre-existing obligation. For example, the user interface may include visual elements identifying loan information of a merchant such as amount left to repay, etc. In addition, the user interface may include configurable input fields and elements for configuring an amount of POS terminal transactions from the POS terminal to be sent to a lender during an overnight settlement process. In some embodiments, the user interface may include a slider on the user interface that is configured to move in multiple directions to modify the ratio value.

In 602, the method may include receiving, via the first API, a selection of a ratio value which is input within a data entry field of the user interface. For example, the receiving may include receiving a configuration of a loan repayment percentage selected by the merchant user. For example, the detecting may include detecting a change in the ratio of value based on movement of the slider within the user interface. In some embodiments, the method may further include generating an estimate of how much will be repaid during a current month based on the received selection and displaying the estimate on the user interface. Here, the estimate may change when the user moves the slider to change the percentage to be split and given to the lender. The estimate may be determined based on a previous number of months of sales. For example, the estimate may be based on a previous 3 months, 6 months, etc.

In 603, the method may include generating an API call comprising a request to push a percentage value of daily transactions of a merchant point-of-sale terminal (POS) based on the selected ratio value received via the first API. Furthermore, in 604, the method may include transmitting the generated API call to a computing system that is associated with the repayment of the pre-existing obligation via a second API. Here, the second API may configure communication protocols between a lender computing system and an acquirer computing system. This type of communication is not performed or available in the present art.

In some embodiments, the method may further include downloading software which includes the first API from a web server, and installing the software within a computing system associated with a lender of the pre-existing obligation. As another example, the method may include installing the software within a computing system associated with a financial services organization of a lender of the pre-existing obligation. In some embodiments, the transmitting may include transmitting the generated API call to an application programming interface installed within an acquirer.

FIG. 6B illustrates a method 610 of pushing a payment transaction based on a ratio value configured by a merchant in accordance with an example embodiment. Referring to FIG. 5B, in 611 the method may include receiving point-of-sale (POS) transactions from a merchant POS terminal. For example, the POS transactions may be credit and debit card transactions based on payment cards that are read/inserted into a POS terminal that is configured to read payment account data from a chip, a magnetic stripe, and the like. As another example, the POS terminal may receive payment transactions via near-field communications (NFC) in which a mobile device is placed in close proximity to the merchant POS terminal.

In 612, the method may include receiving a request to allocate a portion of the POS transactions from the merchant POS terminal to a lender payment account. For example, the request may be received via a user interface which is displayed via the API. The request may identify a portion (e.g., a percentage, ratio, etc.) of payments of the merchant terminal that are to be split off and forwarded to a lender's payment account. In some embodiments, the receiving the POS transactions may include receiving the POS transactions via a payment network and receiving the request may include receiving the request via a non-payment network.

In 613, the method may include depositing the POS transactions received from the merchant POS terminal into a merchant payment account during a settlement process. The depositing process may be performed by depositing a first transaction which deposits the entire amount of the POS transactions into the merchant's payment account. In 614, the method may further include automatically triggering, via an application programming interface (API), a payment transaction that pushes the portion of the POS transactions from the merchant payment account to the lender payment account. The acquiring bank may automatically initiate the lender's payment transaction (a second transaction) at a point in time that is almost instantaneous with the depositing of the first transaction.

In some embodiments, the automatically triggering may include automatically triggering the payment transaction at a predetermined period of time after the deposit of the POS transactions into the merchant payment account. In some embodiments, the method may further include aggregating the POS transactions from the merchant for a predetermined period of time, depositing the aggregated POS transactions via a deposit transaction during an overnight settlement process, and automatically initiating the payment transaction based on when the deposit transaction occurs. In some embodiments, the method may further include inserting a virtual card number (VCN) of the lender payment account into the payment transaction and pushing the payment transaction with the inserted VCN via a payment network.

Figure 7:
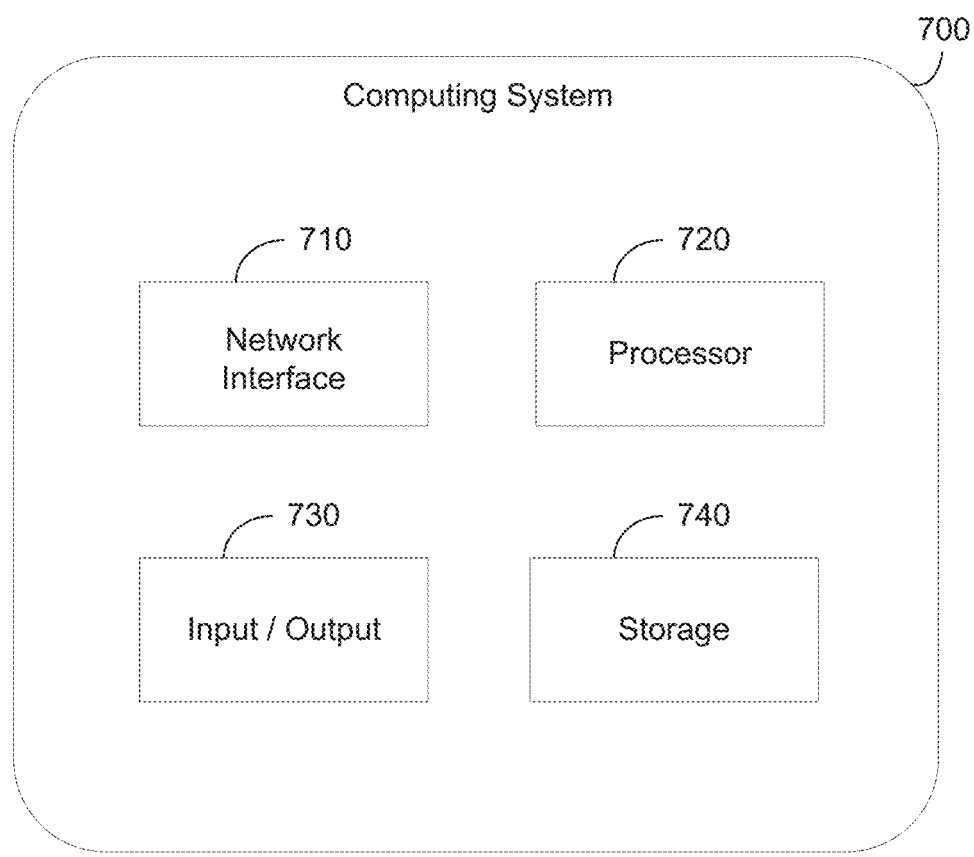
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a mobile device, a server, a cloud platform, a payment network system, a merchant computer, or the like. In some embodiments, the computing system 700 may be distributed across multiple computing devices. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control or replace the other components of the computing system 700.

The network interface 710 may transmit and receive data over a network such as the Internet, a private network, a public network, a payment network, an enterprise network, and the like. The network interface 710 may include a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the methods described herein.

According to various embodiments, the processor 720 may output a user interface for configuring repayment of a pre-existing obligation which can be accessed via a first API. Furthermore, in conjunction with the network interface 710, the processor 720 may receive, via the first API, a selection of a ratio value which is input within a data entry field of the user interface. In response, the processor 720 may generate an API call comprising a request to push a corresponding ratio of transactional values from a merchant point-of-sale terminal (POS) based on the selected ratio value received via the first API. Furthermore, the network interface 710 may transmit the generated API call (to push the percentage of daily receipts) to a computing system that is associated with the repayment of the pre-existing obligation via a second API.

According to other various embodiments, the network interface 710 may receive transactions of a merchant such as payment transactions that are processed using a merchant point-of-sale terminal. The processor 720 may receive, via an application programming interface (API), a data request to push a ratio of the payment transactions received from the POS terminal to a lender. Furthermore, the processor 720 may control the network interface 710 to determine an amount of daily value in POS transactions of the merchant to transmit to the lender based on the ratio value and send the daily value to a computing system associated with a lender of the merchant.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An apparatus comprising:
a network interface; and
a processor configured to
download an application programming interface (API) from a data source and install the API at a computing system of a lender;
detect selection of a button on a website of the lender during a session between a computing system of merchant and the computing system of the lender,
in response to the detected selection of the button, redirect the session to a secure service and execute an authentication between the computing system of the merchant and the secure service based on instructions stored at the computing system of the lender and an input from the computing system of the merchant;
output, via the API, a user interface for configuring repayment of the pre-existing obligation of the merchant with the lender,
detect, via the API, a user input on the user interface which configures a repayment ratio value,
generate an API call that configures a recurring and automatic push of a portion of merchant point-of-sale terminal (POS) transactions aggregated over the course of a day to the lender via an acquirer of a payment account of the merchant based on the selected repayment ratio value, wherein the API call comprises a merchant identifier, an account identifier of a payment account of the merchant with the lender, and a request to split merchant POS transactions according to the repayment ratio value detected from the user input on the user interface, and
transmit the generated API call to a computing system of the acquirer of the merchant via a second API.

2. The apparatus of claim 1, wherein the processor is configured to output a slider element on the user interface that is configured to move in multiple directions to modify the repayment ratio value.

3. The apparatus of claim 2, wherein the processor is configured to detect a requested change in the repayment ratio value based on movement of the slider within the user interface.

4. The apparatus of claim 1, wherein the processor is configured to estimate a forecasted change to a monthly value that will be repaid on the existing obligation based on the received selection of the repayment ratio value and display the estimate on the user interface.

5. The apparatus of claim 1, wherein the processor is configured to download software which includes the API from a web server, and install the software within the computing system of the lender of the pre-existing obligation.

6. The apparatus of claim 1, wherein the processor is configured to download software which includes the API from a web server, and install the software within a computing system associated with a financial services organization of a lender of the pre-existing obligation.

7. The apparatus of claim 1, wherein the network interface is configured to transmit the generated API call to the computing system of the acquirer via an application programming interface installed within the computing system of the acquirer.

8. An apparatus comprising:
a network interface configured to receive point-of-sale (POS) transactions of a merchant from a merchant POS terminal over an electronic payment network; and
a processor configured to
download and install an application programming interface (API) that enables a computing system of a lender and a computing system of an acquirer of the merchant to communicate directly with each other,
receive, via the API, an API call from the computing system of the lender with a request to allocate a ratio of daily payments submitted from the merchant POS terminal to a lender payment account, the API call comprising a merchant identifier, an account identifier of a payment account of the merchant with the lender, and a request to split merchant POS transactions according to a repayment ratio value, establish a recurring and automatic push of a portion of daily POS transactions to the lender payment account to repay a pre-existing obligation of the merchant with the lender based on the repayment ratio value, aggregate the received POS transactions and execute a settlement process for a predetermined period of time via the electronic payment network which deposits the aggregated POS transactions received from the merchant POS terminal during a day into a payment account hosted by an acquirer of the merchant corresponding to the account identifier included in the API call, and execute an additional payment transaction via the electronic payment network that pushes a repayment amount of funds from the merchant payment account to a computing system that hosts the lender payment account via the electronic payment network based on the aggregated POS transactions received from the merchant terminal and the established repayment ratio value, wherein the processor intentionally delays the execution of the additional payment transaction until a predetermined period of time after an end of the settlement process which is almost instantaneous with the end of the settlement process, and automatically pushes the additional payment transaction to the computing system that hosts the lender payment account after an end of the predetermined period of time.

9. The apparatus of claim 8, wherein the network interface is configured to receive the POS transactions via the electronic payment network and receive a request to allocate a portion of the POS transactions of the merchant via a non-payment network.

10. The apparatus of claim 8, wherein the request to allocate is input via a graphical user interface (GUI) that is displayed via the API.

11. The apparatus of claim 8, wherein the processor is further configured to deposit funds for the aggregated POS transactions via a deposit transaction during the settlement process, and automatically initiate the payment transaction based on when the deposit transaction occurs.

12. The apparatus of claim 8, wherein the processor is configured to insert a virtual card number (VCN) of the lender payment account into the payment transaction and push the payment transaction for the repayment of funds with the inserted VCN via the electronic payment network.

13. A method comprising:
receiving, via a network interface, point-of-sale (POS) transactions transmitted from a merchant POS terminal over an electronic payment network;
downloading and installing an application programming interface (API) that enables a computing system of a lender and a computing system of an acquirer of the merchant to communicate directly with each other;
receiving, via the API, an API call from the computing system of the lender with a request to allocate a ratio of daily payments submitted from the merchant POS terminal to a lender payment account, wherein the API call comprises a merchant identifier, an account identifier of a payment account of the merchant with the lender, and a request to split merchant POS transactions according to a repayment ratio value;
establish a recurring and automatic push of a portion of daily POS transactions to the lender payment account to repay a pre-existing obligation of the merchant with the lender based on the repayment ratio value;
aggregating the received POS transactions and depositing funds from the aggregated POS transactions into a merchant payment account during a daily settlement process;
automatically triggering a recurring payment transaction that pushes a portion of the aggregated POS transactions from the merchant payment account to the lender payment account via an electronic payment network based on the established repayment ratio value, wherein the automatically triggering comprises intentionally delaying the execution of the recurring payment transaction until a predetermined period of time after an end of the daily settlement process which is almost instantaneous with the end of the daily settlement process, and automatically pushing the recurring payment transaction to the computing system that hosts the lender payment account after an end of the predetermined period of time; and
iteratively triggering additional recurring payment transactions over the electronic payment network on additional subsequent days which push portions of additional funds from additional aggregated POS transactions received from the merchant POS terminal from the merchant payment account to the lender payment account.

14. The method of claim 13, wherein the receiving the POS transactions comprises receiving the POS transactions via the electronic payment network and receiving a request to allocate a portion of the POS transactions via a non-payment network.

15. The method of claim 13, wherein the depositing comprises depositing funds for the aggregated POS transactions via a deposit transaction during the daily settlement process, and automatically initiating the recurring payment transaction for the predetermined period of time based on when the deposit transaction occurs.

16. The method of claim 13, wherein the method further comprises inserting a virtual card number (VCN) of the lender payment account into the recurring payment transaction and pushing the recurring payment transaction for the repayment of funds with the inserted VCN via the electronic payment network.

* * * * *